3,331,785
PREPARATION OF MICROSPHERES OF URANIA
AND OTHER MATERIALS
Frederick Troop Fitch, Baltimore, and Ann Baker Braun, Rockville, Md., assignors to W. R. Grace & Co., New York, N.Y., a corporation of Connecticut
No Drawing. Filed Apr. 11, 1966, Ser. No. 541,519
18 Claims. (Cl. 252—301.1)

This application is a continuation-in-part of application Ser. No. 329,981 filed Dec. 12, 1963, and application Ser. No. 192,088 filed May 3, 1962, in the name of Frederick T. Fitch and Ann E. Baker, now by marriage Ann B. Braun. Both of these applications are now abandoned.

This invention relates to methods of preparing spherical particles of controlled size formed of colloidal residues by drying aquasols. In one particular embodiment, it relates to preparing dense spheres of nuclear materials such as urania, other actinide oxides, zirconium oxide, systems containing actinide oxides and actinide oxide solid solution systems.

In recent years oxides of the actinide metals have become of paramount importance in the field of nuclear fuel development. These oxides may be used in the form of pellets or may be in the form of irregular granules which can be packed to high density by swaging or vibratory techniques. The fabrication of these oxide particles from ceramic powders requires compaction or pelleting, followed by prolonged sintering at extreme temperatures. Fuel pellets must be subjected to precision grinding because of the cladding requirements of the nuclear fuel structures.

Uranium dioxide is one of the better known oxide nuclear fuels. Uranium dioxide has a disadvantage in that it is subject to oxidation. The resulting phase changes disrupt the ceramic elements. In gas cooled reactors and high temperature applications, there are the additional disadvantages of fuel loss due to volatility of the uranium and release of fission products.

The disadvantages inherent in $UO_2$ ceramic fuel elements have been overcome with the recent development of coated microspheres. The microspheres are now of considerable importance and several reactor designs are based on the use of microspheres in production of the fuel elements. Such microspheres consist of dense actinide oxide spheres 50 to 200 microns in diameter which are protected by an impervious coating. This coating protects the oxide against oxidation and retains the fuel and fission products within the system. Important coating materials are niobium, alumina, pyrolytic graphites and other similar materials. These microspheres are used in the fuel elements, either dispersed in the ceramic material or as a cermet element.

The present methods for the preparation of microspheres are laborious, costly and result in a low yield of microsphere products. From a practical standpoint, they are of limited effectiveness. The product itself which results from the present methods of preparation suffers from lack of sphericity, uniform structure and surface irregularities. It is also well known that the strength characteristics of the microspheres prepared by the present technique leave much to be desired.

The principal difficulties encountered in microsphere preparation are technical difficulties that arise from using ceramic powders in the preparation of these very small shapes. Ceramic powder has to be compacted before sintering to high densities. The present methods for preparing these microspheres generally depend on grinding the powder, compacting, crushing to the desired size range, bringing the particles to a general spherical size and shape by abrasion techniques and sintering to high density. The material must be sized and recycled at the various stages. The yield in each of the different steps is very low.

It is obvious that this process is both laborious and time consuming. The importance of simple processes in the development of nuclear elements cannot be overemphasized. Engineers generally compute the cost of setting up shielded, remotely operated equipment at about ten times the cost of setting up ordinary plant equipment. Thus a simple process that requires less equipment results in substantial cost reduction.

We have found that actinide oxide sols can be used in the preparation of the microspheres for eventual use in nuclear fuel elements. The use of these sols permits relatively simple direct procedures for the preparation of microspheres and results in improvements in their properties. These advantages result from the utilization of the fluid properties of the sol to obtain uniform spheres with a regular microstructure. The colloidal oxide constituents contribute both to the sintering and to the properties of the microspheres. Colloidal particles range in size from a few to greater than 300 millimicrons. The thoria and urania sol particles, for example, are actually aggregates of still smaller particles about 3 to 5 millimicrons in size. These particles, due to their small size and large surface area, have a strong tendency to coalesce.

Aquasols on drying form colloidal residues in which these extremely small particles are closely and uniformly enough packed that sintering to high density or reaction of constituents to dense oxide solid solution phases or products occurs rapidly and at unusually low temperatures. The uniform microstructure of the colloidal residues contributes both to the ease in obtaining and the characteristics of the sintered dense product.

The sols used in the preparation of our novel particles are well known. One suitable method of preparing and a description of thoria sols is covered in application Ser. No. 693,511, filed Oct. 31, 1959, now U.S. Patent 3,097,175. These sols have a high solids content and are made up of particles that have no tendency to settle. The particles are substantially spherical in shape and have low viscosity. The sols maintain their physical properties for long periods of time and have no tendency to form gels. They are distinguished from some of the other particle dispersions in that they are non-gelling.

The novel microspheres of our invention can be prepared from various colloidal materials that sinter to suitable ceramics, for example, the colloids of alumina, zirconia, beryllia, etc.

One specific example of the use of these materials is found in the field of nuclear fuel development. Particular materials suitable for nuclear development include actinide oxides, mixtures of these oxides, solid solution systems of actinide oxides with rare earth oxides oxides, with zirconium oxide, with beryllium oxide, etc. The actinide metals include the elements in the actinide series in the periodic table, thorium, uranium, neptunium, plutonium, americium, etc.

The elements properly included in the group designated "rare earths" are the basis of some controversy. We include element No. 39, yttrium, with the members of the lanthanide series, beginning with element No. 58 through element No. 71 of the periodic table. Thus we include cerium, praesodymium, neodymium, promethium, samarium, europium, gadolinium, terbium, dysprosium, holmium, erbium, etc., with yttrium in our definition of the rare earths.

Our co-pending application Ser. No. 305,828, filed Aug. 30, 1963, describes these spheres prepared from colloidal material. The preparation of these spheres from sols has several advantages. In the first place, most of the sols are compatible and on mixing provide an extremely intimate uniform mixture of their reactive colloidal constituents. Most desired composition ranges are readily obtainable. The fluids can be dispersed to small droplets of controlled size and oxide concentration, factors which provide a product sphere of uniform size. The spherical droplet shape resulting from surface tension effects is retained during drying to the microspheres. The green microspheres sinter readily to high density retaining their uniformity, sphericity and smooth surfaces. We have found that microspheres can be prepared simply and directly from oxide aquasols by dispersing the sols to droplets and drying the dispersion to form spheres. This process requires control and uniform conditions to avoid material deformation, cracking, structural defects, etc. Drying to prepare the microspheres according to the process of this invention can best be accomplished using an immiscible solvent as a drying medium, but other methods which accomplish the controlled drying of the dispersed droplets should be applicable in the process of our invention.

Although our process will be described using immiscible solvents, these other methods of drying the sols will be considered applicable in the process of the present invention. Each of the processes discussed infra follows the general conditions required but has its own limitations as to solvents and conditions imposed by the method and materials. Our process of preparing microspheres and sols has several advantages. The sols can be mixed to obtain almost any ratios of individual oxides or their mixtures and wide composition ranges in the finished product are readily and simply obtained. In addition, because of the fluid properties of the sols, they are readily dispersed, forming droplets which maintain perfect spherical shape through to the dried form. The size of the final sphere can be readily controlled by control of droplet size and concentration.

The drying requirements for the process of our invention are relatively rigorous. The drying must be done in such a manner that the particles retain their sphericity, uniform surfaces and internal structure. The conditions necessary to accomplish this are quite limited, although they vary appreciably with the various materials, solvents and procedures that can be employed. This is due to the fact that water is a large volume fraction of the droplet or the sphere during drying and solidification. The volume fraction of the water is greater than 95% in the initial sol droplets and generally 60–25% during solidification which preferably occurs at a relatively high weight percent solids, e.g., 80–86 weight percent for $UO_2$ sol, for example. The volume fraction of water is generally less than 55% in the solidified product. Essentially all of the microspheres recovered as products have volume fractions of water in the range of 60 to 25%.

The decreases in droplet volumes during all stages of dehydration and solidification are large. Despite the fact that water is removed by transfer to the external solvent, drying or concentration gradients within the droplet must be kept at negligible levels. This will result in solidification in gradients or localized spots and the subsequent differences in shrinkages will adversely deform, distort, or crack the sphere unless the drying is carried out under very carefully controlled conditions.

The desired results are not generally obtained on drying sols until the effective moderating conditions have been discovered. Deformed shapes generally result from shell-like drying gradients on solidification. Severe cracking readily occurs with non-uniform solidification shrinkages. It is preferable to dehydrate the droplet maintaining the liquid state to the high concentration where solidification can occur discreetly to a rigid colloidal residue with negligible non-uniform shrinkage. It is important to avoid any prior gellation which can result in subsequent undesirable shrinkage or deformation.

Thus, the method used to dry the sol droplets may vary considerably from process to process but the conditions in each process must be controlled to obtain a uniform sphere. One method that is useful as a laboratory method of preparation is the drying of small sol quantities with excessive solvent volume. The more practical method of drying the sol is to dry the sol droplets at intermediate temperatures by settling through a long column or at higher temperatures in a stirred boiling solvent system. Each procedure requires that the controlling conditions be adjusted to an optimum suited to the particular method.

There are several controlling factors in drying the spheres. The conditions most directly involved in drying to uniform spheres, and which must be adjusted in each case, are temperature, the solvent, the water solubility in the solvent, the water content of the solvent, the colloidal materials themselves, and the mechanical process conditions. These conditions must be adjusted to obtain a moderated drying at desired rates maintaining uniformity through the conversion of the droplet to the dried sphere. The droplets have been dried to acceptable spheres in times from as short as 3–4 seconds. In other processes this time may increase to several minutes, but times of from 30–90 seconds are generally a practical optimum.

Temperature is one of the principal controlling factors in obtaining suitable drying. Generally, there is limited operating temperature range for each process, and other conditions of the process must be adjusted to operation in this temperature range. The lower temperatures provide undesirably slow rates, while higher temperatures tend to accentuate the physical conditions that result in the production of defective spheres. Increased temperature increases both water solubility in the solvent and the rate of water exchange to the solvent thus increasing the severity of the solvent dehydrating action. If the temperature is too high, the dehydrating action is too severe and defects in the product result. Increased temperature also increases fluidity and the water vapor pressure which are factors increasing uniformity within the drying droplets or solidifying sphere.

The temperature of operation of the processes of our invention is not limited to the boiling point of water or lower. It is frequently desirable, for that matter, to carry out this drying at temperatures substantially above 100° C. At these higher temperatures, protective insulating temperature and diffusion gradients apparently form around the droplet to protect it against disruptive boiling. It is critical, however, when in operation at these higher temperatures, that severe agitation that would disrupt these protective gradients be avoided to prevent the droplet boiling. As is stated previously, each system is a separate entity and generally the optimum temperature range system must be developed experimentally.

Another critically important variable is the solvent. The solvents to be used in the processes of our invention must be inert media which supply heat for drying and remove water by exchanging the water from the sol droplet. These solvents have generally been selected from higher alcohols, the hydrocarbons or chlorinated hydrocarbons. The solvents should have a medium to low viscosity, a limited tendency to emulsify and have a minimum of other objectionable physical characteristics. The density is not a critical factor except that it relates to the desired settling characteristics of the droplet. That is, in the column reactor, the density must be generally less than 1.1 to permit the droplets to settle. In the stirred, boiling reactor, the hot solvent should have a density of greater than 1.1 to 1.3 depending on equipment dimensions to maintain droplet buoyancy so that the dispersion can be easily maintained.

Another important characteristic of the solvent is the solubility of water in the solvent. Since a higher solubility results in a stronger dehydrating action which readily becomes uncontrolled to the point of causing sphere defects, solvents are selected with limited solubility for water related to the process conditions. In general, the solubility of water in the solvent bears the following relationship to the type of system being used. In the boiling stirred system, the perferred solvents are chlorinated hydrocarbons plus alcohols with a water solubility of 1 weight percent or less. In the intermediate temperature column reactor, generally a higher alcohol with a water solubility of 4 to 12 weight percent gives satisfactory results. Thus, solvents with lower solubility for water are required in processes with higher temperature and more rigorous dehydrating conditions.

The water content of the solvent further moderates its drying action and is adjusted to prevent sphere defects. This is particularly true in the column reactor where solvents of intermediate water solubility, approximately 4 to 12%, are used. Thus, with ethyl hexanol which has a solubility for water of about 4 weight percent, no efforts are made to increase water content beyond equilibrium levels, but with hexanol which has a water solubility of about 10 to 11% at operating temperatures, water contents of 2 to 6% are desirable with most of the sols being used. This water content helps to prevent sphere defects. With butanol which has a much higher solubility for water of about 28 to 30% at operating temperature, it is difficult to avoid sphere defects when most of the sol materials are being dried. This is accomplished only with a nearly saturated solvent.

These sols used in sphere forming process should be homogeneous fluids and should dry to uniformly packed colloidal structures amenable to subsequent sintering to dense spheres. These requirements are met only by colloidal materials. Suspensoids, hydrogels and other related materials would not meet these requirements and would be undesirable to varying degrees.

The wide range of sols of our experience which have been dried to spheres have each required various adjustments in conditions to accomplish this drying. It would be obviously possible to extend this procedure to other well defined oxide sols such as sols of alumina ($Al_2O_3$), titania ($TiO_2$), iron ($Fe_2O_3$), etc.

The particle shape of the sols and the particle size of the sols contribute too in the drying characteristics of our product. We have found that drying to defect-free spheres can be more easily accomplished with sols of a wide size range and of irregular particle shape than with the sols having a more uniform particle size and shape. For example, a $UO_3$ sol prepared by a peptization technique is easily dried to spheres under most conditions, whereas the $UO_2$ sol which is characterized by a more uniform particle size may require quite specific conditions and even a hydrogen peroxide pre-treatment to give a satisfactory product. In certain sols, for example, $UO_2$ based sols, there has been some variation in drying behavior noted between batches. It has been found convenient to pretreat such sols to obtain a consistent drying behavior. The drying behavior of $UO_2$ spheres is improved and the product is more uniform if the sol is pretreated with hydrogen peroxide; that is, 1 to 10% of the stoichiometric $H_2O_2$ is stirred into the sol which is then heated to 60° C. before use.

Another important variable is the drying method. It has been demonstrated that sol droplets can be dried to spheres and several methods of contacting the spheres with the immiscible solvents have been demonstrated always under the foregoing conditions. However, the practical process conditions for sphere production were realized only with the following approaches:

(a) Dispersing sol droplets into a stirred boiling solvent system with continuous recovery of dried product spheres on settling from the system; and (b) Drying sol droplets by settling into a column of hot counter-flow solvent and continuously removing the dried spheres from the column bottom.

Each of these methods, although quite different in equipment design, are essentially only modifications of the foregoing drying process and are discussed in detail below. To avoid confusion, each of the systems is discussed separately below:

DRYING IN A STIRRED BOILING REACTOR

In this system sol droplets of controlled size, generally within range of 0.1 to 1.0 millimeters in diameter, and a concentration of 1 to 30 weight percent solids were dispersed into a boiling uniformly stirred water immiscible solvent with a density of greater than 1. The solvent was strongly heated to remove water continuously as a water-solvent distillate at rates equivalent to the addition of water to the mixture as sol. The distillate solvent, after water separation, was continuously returned to the boiling solvent pot. The droplets on drying to microspheres settled to the bottom and collected due to their greater density from the central stirring vortex at the bottom of the reactor. These spheres were removed, preferably continuously from this point, separated from the solvent and dried before being sintered to high density. This stirred boiling reactor system had the advantage of accomplishing in one operation all of the basic steps; that is, sphere formation and water removal from the system. It has the disadvantage of limiting the range of droplet drying conditions to distillation requirements and of equipment dimensions larger than permitted by criticality when dealing with enriched urania. The sols are injected into the solvent in this system and on injection into the boiling immiscible solvent, the sol droplets dry to microspheres within 10 to 45 seconds. Most of this drying period is at the lower sol concentrations where the bulk of the water is removed. The droplets tend to rise at these low concentrations when their density is less than that of the solvent and to sink during the much shorter period at high concentration and increased density just prior to drying. Solvent densities of greater than 1 are required to provide sufficient buoyancy during drying to maintain droplet dispersion. Reactor dimensions should be such as to allow sufficient settling distance for the spheres to dry before wall contact. On settling, the microspheres collect on the bottom in the vortex of the stirred solvent. Their continuous removal from this point, separation from the solvent stream and recycle of the solvent is both convenient and desirable in the larger reactors.

A feature of this process is the selection of the solvent or solvent mixture to have a suitable density, boiling point, and low solubility for water (generally 1 weight percent or less) under these strong dehydrating conditions. The density should be sufficiently above 1 to provide sufficient buoyancy during most of the drying period to maintain dispersion and also to prevent collection and coalescence of the droplets on the bottom or sides of the vessel. The precise requirement in this regard are determined by the equipment dimensions and other practical considerations. A hot solvent density of 1.1 to 1.3 has been generally preferred in the equipment dimensions used in the examples. Solvent mixtures that provide an effective distillation rate are required. Operating temperature ranging from 70° C. to 160° C. have been used, but a range of 120–155° C. was generally preferred. Chlorinated solvents generally are the main constituents of the solvent mixture due to their density, availability, cost considerations, and their low acceptable solubility for water. However, it should be recognized that a number of fluorinated and brominated solvents also meet these requirements. In particular, di- and trichloro benzene, carbon tetrachloride and tri-, tetra, and pentachloroethane are useful solvent constituents in obtaining suitable density and volatility. For example, mixtures of 2–3 parts monochlorobenzene and 10 parts dichlorobenzene or of 5 parts tetrachloroethane and 5 parts dichlorobenzene have been useful solvent mixtures. These solvent mixtures were generally improved by the addition of a small quantity of alcohol such as for example 5 to 10% butanol, by volume.

The applicable sol concentrations are governed principally by practical considerations, droplet size and the desired product microsphere size. Concentrations of 1 to 35% $UO_2$, for example, have been used in obtaining spheres of from 25 to 250 microns in diameter. Mixtures of sols may be used to obtain oxide solid solutions phases on sintering. Thus, the use of mixtures of sols in suitable proportions yields a microsphere with the colloidal oxides in intimate contact which will sinter readily to a dense oxide solid solution phase.

Sol injection has been accomplished with submerged needles or related devices which provide uniformly sized droplets. Flows of 5 to 12 cc. sol per minute have been realized, providing a capacity of 20 to 100 g. of microspheres per hour per injection device. The process is capable of being scaled-up with multiple sol injection devices to appreciable capacity with little change in the process steps.

On removal from the solvent, the microspheres can be dried using any of the conventional techniques, such as heating in an inert gas stream, vacuum drying, etc. After the preliminary drying treatment, the microspheres may be sintered to high density.

While operation at atmospheric pressure generally is intended for practical reasons, it is recognized that other pressures could be employed without altering the essential features of the process. We thus intend to include operation at pressures of from about 0.1 to 10 atmospheres.

SPHERE FORMATION IN HOT SOLVENT COLUMN

Spherical materials can also be made using a hot solvent column system. In this system, sol droplets can be continuously dried to spheres by allowing the droplets to settle through a long column of hot solvent of controlled temperature and water content. The spheres are collected in the bottom cone of the column and are continuously removed by suction, separated from the solvent and dried before sintering to high density.

The solvent is circulated through the column preferably in a counter current direction to a distillation pot for water removal. The distillation pot serves as a solvent reservoir for the system and can be controlled by adjusting water removal and distillation temperature to provide solvent of the desired water content. A water cooler on the input line adjusts the solvent temperature to the desired value. This process has the advantage of providing a wide range of drying conditions and has equipment dimensions within critical limits for handling enriched materials.

One embodiment of the equipment useful for the first process comprises a column 7 feet in length and 3 inches in diameter with a conical bottom to collect the settling spheres. The solvent is pumped through a cooler to adjust the temperature at a flow rate of 1 to 2 liters per minute into the column four inches from the bottom of the column. The solvent is removed from the column at a point four inches from the top and is passed through flow meters to a distillation pot. The distillation pot for this particular system has a capacity of 50 liters. Twenty-five liters of solvent are used in operation of this system. The distillation pot is used for water removal and serves as a solvent reservoir for the system. Water removal can be adjusted to maintain a given distillation temperature and water content for the system.

The sol is injected into the top of the column thru submerged needles or a related droplet sizing device. The droplets dry while settling in one-half to four-fifths of the column length and are collected in the bottom column cone. They are continuously withdrawn from the cone by suction thru a one-eighth inch tube, separated from the solvent and dried prior to sintering to high density.

Choice of the solvents for this system is critically important. The solvents giving the best results are the higher alcohols which have the desired solubility for water. The solvents must be inert, free of objectionable physical properties, such as emulsifying tendencies for example, and must have a density low enough to permit settling preferably a density below one. The solvents selected must have saturation concentrations with water within a certain range permitting adjustment of drying conditions, solubilities for awter of 3 to 4% to 30% have given satisfactory results. A water solubility of 4 to 12% is preferred for drying a majority of sols in this system.

A few of the sols are relatively insensitive to high water solubility, such as, for example, the $UN_3$ sols. Many sols ($UO_2$ sols, for example) require some moderation of the dehydrating action for solvents of high water solubility in this range. For example, ethyl hexanol with a 4 to 6 weight percent hot solubility for water is used with low equilibriant water contents for dehydrating $UO_2$ sols. Hexanol, with a 10 to 11 weight percent hot solubility for water is used in water content of 3 to 6 percent. Butanol, which has a hot solubility for water of about 28 weight percent, is used under only very limited conditions and nearly saturated with water.

The sol ratios and capacities are similar to those covered in the description of the previous reactor. The droplet drying and sintering conditions are also very similar to those discussed previously.

Our invention is further illustrated by the following specific but non-limiting examples.

Example I

Some of the problems involved in drying sol droplets were demonstrated in small qualitative experiments by injecting 0.25 ml. quantities of $UO_2$ sol into hot solvent about 1 inch in depth in the bottom of a 400 ml. beaker with a thin Teflon sheet on the bottom of the beaker. The droplets when settled were supported without wetting or coalescing on a Teflon sheet and their drying performance could be observed. Spheres of 50 to 300 microns in diameter were formed.

In one such run, a 16 percent $UO_2$ sol was injected into a solvent consisting of 10 parts trichloroethane and one part butanol heated to a temperature of 126° C. There was sporadic break-up to smaller droplets due to the intense heat and boiling action. The droplets dried in about 15 seconds forming perfect black spheres with shiny, smooth surfaces. The above experiment was repeated with central uniform stirring of the solvent. The droplets dried immediately. There was extensive deformation due to shrinkage during solidification which resulted in large diameter craters or depressions thus mis-shaping the dried particles.

The above experiment was repeated in the third run using one part of trichloroethylene and 10 weight percent of a commercial motor oil as the solvent mixture. The solvent mixture was heated to 125° C. With this more viscous solvent, having even lower solubility for water, drying required about 2 minutes, occurred smoothly without any physical disturbance or droplet break-up. Perfect spheres were formed but the surface had a dull texture. In the next run, the run described above was repeated using 10 weight commercial motor oil along which was heated to 128° C. This treatment yielded small, highly fractured particles. With this viscous solvent having negligible solubility for water, droplet drying was accomplished by heat alone without any solvent dehydrating actions.

Each of these runs was extremely sensitive to minor changes in the physical conditions. These runs have been only qualitatively indicative of the drying performance or reproducibility. The drying of dispersed droplets or spheres was demonstrated as well as various inherent difficulties requiring careful control during the dehydration process. These difficulties primarily involve droplet breakup which destroyed size relationships, sphere deformation due during solidification, and fracture.

Example II

A total of 12 liters of solvent (1 part monochlorobenzene and 5 parts dichlorobenzene by volume) was added to a 22-liter 3-neck flask equipped with stirrer and condenser. This solvent mixture had a density of 1.269 when cold and 1.14 when hot (144° C.). A solvent water separator was attached to the condenser with return of the solvent condensate to the flask. Two concentric tubes passed into the flask and extended about 2 inches below the solvent surface. Water or an aqueous uranium dioxide sol was passed through the inner concentric tube and injected into the solvent from a number 23 hypodermic needle to form regular small droplets. The cooled solvent condensate was passed through the outer concentric tube to maintain water or sol temperatures. A short Teflon shield (0.5" in length) on the end of the concentric tubes protected the sol droplets from stirring turbulence during formation.

The solvent mixture was heated to 146° C. with stirring and this temperature was maintained throughout the rest of the procedure. Water was passed through the hypodermic needle at 5.3 ml. per minute for 25 minutes until steady distillation conditions had been obtained. Distillation was rapid and in balance with the input water, being about 34 to 37 ml. solvent per 5.3 ml. of water per minute.

A uranium dioxide aquasol was then substituted for the water and injected at the same rate. A total of 20 ml. of aquasol at 1.9% uranium dioxide concentration was dispersed into the boiling solvent mixture by this technique The sol droplets were dispersed into the stirred solvent and the dried microspheres settled and collected on the flask bottom. On completion of the addition of urania sol, water was again passed into the system for 2 minutes. Heating was stopped and the residual traces of water remaining distilled quickly from the system. The product microspheres were recovered by suction from their central collection point at the bottom of the flask, separated from the solvent and dried.

The product consisted of free, small, dense spheres of urania with a smooth lustrous surface. The size ranged from 20 to 120 microns. Screening indicated that the product had been directed largely to a 74 to 105 micron size range. The distribution was as follows: about 10% greater than 149 microns, about 15% in the range of 105 to 149 microns, about 50% in the range of 74 to 105 microns and about 25% below 74 microns.

This run was repeated with a 6.3 weight percent uranium dioxide sol to observe the effect of concentration on particle size using 24 liters of solvent (equal parts by volume of tetrachloroethane and dichlorobenzene) in a 50-liter flask. This solvent had a density of 1.445 when cold and 1.25 when hot. Water or sol injection was four inches below the solvent surface. Distillation conditions were established at 156° C. by injecting 4.6 ml. water per minute which resulted in a solvent recycle of 170 ml. per minute. Urania aquasol (6.3 weight percent $UO_2$) was then injected into the boiling solvent to form microspheres and the product recovered as above. The product consisted of dense, smooth spheres in the range of 30 to 170 microns in diameter. Screening showed that the fraction above 105 microns had been increased to above 50 weight percent at the higher sol concentration.

This run was repeated to form $UO_2$–$ZrO_2$ microspheres by injecting a $UO_2$–$ZrO_2$ sol mixture 5 inches below the surface of twelve liters of solvent (3 parts by volume of chlorobenzene and 10 parts by volume of dichlorobenzene) in a 22 liter flask. The equipment and general procedures of the preceding example were used with the following exceptions. Distillation was established at 151° C. yielding a condensate of 6 ml. of water per minute and 66 ml. solvent per minute for recycle. After the distillation rate was established, 125 ml. of a urania-zirconia sol mixture was dispersed into the solvent at a rate of 5.7 ml. per minute. The urania-zirconia sol mixture was prepared by mixing the individual sols in proportions to give 1.9% total oxide, which was 18% $ZrO_2$ and 82% $UO_2$. The product microspheres were recovered and dried as before. The product consisted of smooth spheres with shiny surfaces 20 to 130 microns in diameter. There was no deterioration in physical appearance in a preliminary sintering for 4 hours at 930° C. in hydrogen. X-ray examination showed that even this mild sintering had initiated considerable solid solution formation and crystallite growth.

These runs demonstrated the dehydration of dispersed droplets of $UO_2$ sol and mixed sols in a boiling immiscible solvent of low solubility for water to form dried spheres of colloidal oxide which may be sintered to dense spheres in which the constituent oxides are reacted to a solid solution phase.

*Example III*

Urania ($UO_2$) and urania-zirconia ($UO_2$–$ZrO_2$) microspheres were prepared from their sols in a continuous process. The equipment for this run was generally similar to that described in Example II. The run was carried out in a large stirred reactor which was 15 inches in diameter, had straight walls 12 inches high, and a 45-degree conical bottom. The conical bottom had a one inch diameter exit tube 6 inches in length at its tip. The reactor was fitted with a condenser and water separator for continuous removal of water by distillation and return of solvent from the distillate to the pot.

During the run the product microspheres settled to the bottom of the exit tube and were continuously removed by suction through a ⅛ inch diameter Teflon tube to a trap for removal from the solvent stream. The solvent stream was then returned to the reactor. Water or sol was injected into the reactor as described in Example II through a No. 25 needle about 3 inches below the surface of the solvent in the reactor. The solvent was made up of 10 parts of tetrachloroethane and 1 part butanol by volume. About 33 liters of this solvent mixture was placed in the reactor and stirred with a large Teflon blade to accomplish a steady rotation with 3 to 4 inch vortex with minimum turbulence.

The run was carried out by heating the solvent to 125 to 130° C. and injecting water at a rate of 8.7 cc. per minute until the constant distillation conditions were obtained, the water being removed at the same rate as it was being injected. After the constant distillation conditions were established, the water injection was discontinued and an 18 weight percent $UO_2$ sol was injected at the same rate. The dried spheres formed during the operation and settled from the reactor in 45 to 90 seconds. The spheres collected in the bottom of the exit tube and were continuously recovered by suction and separated from the solvent.

Using the injection rate and solvent volume set out above, a yield approaching 2 grams of $UO_2$ spheres per minute can be obtained. This rate can be increased proportionately by use of a multiple injection system.

The product consisted of black spheres with a smooth shiny surface ranging from 20 to 400 microns in diameter. Yields in the 60 to 80 mesh size ranged from 25 to 35% under these operating conditions.

These conditions were maintained in another run in which the sol feed was changed to a 16 weight percent $UO_2$–$ZrO_2$ sol. The sol was injected at a flow rate of 7.8 cc. per minute. The mixed sol was prepared by mixing individual sols in the proportions to give an oxide composition of 80 weight percent $UO_2$ and 20 weight percent $ZrO_2$.

These examples cover a process of increased capacity for dehydrating dispersed droplets of $UO_2$ and $UO_2$–$ZrO_2$ to microspheres in a stirred distilling column using a solvent having limited solubility for water.

*Example IV*

In this run, microspheres were prepared by drying $UO_2$ sol droplets by a technique which involves settling through a counter flow column of hot solvent of controlled temperature and water content. The water was exchanged to the solvent and removed from the solvent in a second distillation step. This operation represents milder drying conditions than the boiling systems with corresponding modifications in solvent water solubility requirements, temperature, etc.

The equipment used for this run was a column 7 feet long and 3 inches in diameter equipped with a conical bottom for collecting the dried spheres which settled through the solvent mixture. A 50-liter 3-neck stirred distillation flask was fitted with a condenser and solvent water separator and was used for water removal from the system. The separated solvent was returned to the pot and the distillate water either discarded or controlled amounts were returned to the pot as required to maintain a given water content or to control the distillation temperature.

This distillation pot also served as a solvent reservoir for the system wherein the solvent was maintained at a given temperature and water content. The solvent was pumped from the distillation pot through a line with heat exchanger and water cooled to adjust temperature as required. The solvent entered the column four inches from the bottom to provide a slow upward solvent counterflow through the column and to the exit from the column which was 4 inches from the top. The solvent was returned through a flow meter to the distillation pot. In the return solvent line there was provision for recycle of any desired portion of solvent flow to the column bottom.

When the operation was initiated, the conditions were controlled using the same techniques as described previously. Water was used to establish the conditions after which the sol was substituted for water. The sol or water was injected centrally at the top of the column either through a submerged needle, or other device for producing droplets of controlled size, which were dehydrated to dried spheres on passing through the column. The spheres settled and were collected in the cone at the bottom of the column. The dried spheres were continuously removed from the cone bottom through an ⅛ Teflon tube by suction and separated in a trap from the solvent which was returned to the distillation pot.

In addition to the water which was added as a sol, water was added through a number 23 hypodermic needle which was placed in the column at the desired depth. Water was injected through this needle forming a zone of fine spray to maintain the desired water content above the injection point in the column.

In one specific run, a 16 weight percent $UO_2$ sol was injected at the column top into butanol. This solvent has a water saturation of 27 to 28 weight percent at the temperature of operation of the column. The column was operated at 90 to 98° C. at the inlet and 75 to 63° C. at the outlet, solvent flow was maintained at 1500 cc. per minute and was decreased throughout the run to 700 cc. per minute. In this particular run, there was no water spray injection. The changes made in the operation of the column resulted in a substantial improvement in the product. The product recovered in operation at 98° C. was a badly fractured, mis-shapen particle. As the operation of the column was changed to lower temperatures and lower flow rate the product recovered improved appreciably until a substantially larger percentage of acceptable spheres were recovered as the product.

In subsequent runs, the column was operated at an inlet temperature of 90° C. and an outlet temperature of 63° C. The solvent flow was 700 cc. per minute. The water content in the column was further increased to 22 weight percent and a water spray injection used at a rate of 14 cc. per minute at a distance of 65 inches from the top of the column. In this run, the products were perfect spheres with a dull, uniform surface.

In a subsequent run, the operation of the column was changed by using a different solvent and increasing the urania content of the sol being injected. In this run, the column was filled with hexanol and a 35 weight percent $UO_2$ was injected into the top of the column. The column was operated at an inlet temperature of 102° C. and an outlet temperature of 76° C. The solvent flow rate was 1150 cc. per minute with a solvent recycle of 575 cc. per minute. A 35 weight percent $UO_2$ sol was injected at the same rate as the previous runs into the top of the column.

The product recovered from this run was badly fractured spheres, mis-shapen by deep craters. When the water spray was added to the operation of the column, the products recovered were spheres of smooth uniform surfaces. The improvement was brought about by the use of a water content of about 4 weight percent in the column drying zone.

In a subsequent run, the solvent used was changed to ethylhexanol and the column was operated at an inlet temperature of 145° C., and an outlet temperature of 104° C. The solvent was passed through the column at a rate of 3000 ml. per minute with a solvent recycle of 1625 ml. per minute, with no water spray injection. A 14 percent $UO_2$ sol was injected into the column top at the same rate. The product collected were spheres with a smooth, uniform surface.

This series of runs demonstrates the process for allowing the spheres to settle through the hot column of solvent with the solubilities for water ranging from 5 to 30 weight percent.

This run demonstrated the nature of the adjustments in dehydrating conditions necessary to obtain the desired product. These conditions are primarily a function of the solvent's water saturation concentration and its water content. These conditions would be further modified with equipment of different physical dimensions, such as column length, for example.

*Example V*

This run demonstrates preparation of urania-zirconia microspheres using the hot column technique. In this run, hexanol was used as the solvent and the equipment and procedures of Example IV were used.

The sol mixture was prepared by mixing 6067 grams of 15 weight percent uranium dioxide sol with 1520 grams of a 15 weight percent zirconia sol. The sol was prepared by stirring in 38 ml. of 30% hydrogen peroxide and heating to 60° C. The final pH of the sol was 2.8 and the specific conductance was $2.9 \times 10^{-3}$ mho./cm. The column was operated under the following conditions: the distillation pot temperature was about 135° C. with column inlet temperatures of 101 to 102° C. and outlet temperature of 71° C. The solvent flow through the column was 680 cc. per minute. A water spray was injected 65 inches from the top of the column at a rate of 13 cc. per minute. The sol was injected at the column top centrally through a device providing uniform droplets of controlled size and rate. The sol was fed at a rate of about 0.4 gram of oxide per minute. The product recovered consisted of black spheres of uniform surface. The green density of the product was 2.78 or 30 percent of theoretical. Approximately 80 to 90 percent of the spheres were in the 60 to 80 mesh size range. Polished sphere sections showed some internal hair line cracks, both radial and circumferential, apparently due to shrinkages and strains resulting during solidification. These defects were removed on subsequent sintering.

The spheres retained their physical form on sintering at 1600° C. Densities approaching theoretical were obtained on sintering. When milder sintering conditions were used, e.g., time or temperature decreased, the density of the product showed a proportional decrease. For example, after sintering 4 hours at 1600° C. the spheres had a density of 7.48 (79% theoretical), indicating a porosity of 21%. Polished sections indicated that the fractions of the porosity which were of observable dimensions, were distributed uniformly throughout the sphere. The crush strength measured on these spheres ranged up to 2.5 pounds. This crush strength is much higher than usually associated with porosities in this range. The fine uniform structure of the porosity is derived from the colloidal constituents and the preparation conditions appear to be a factor in obtaining the desirable crush strength and the accompanying porosity.

This example demonstrates a process for the preparation of dried colloidal $UO_2$—$ZrO_2$ microspheres based on drying sol droplets by settling in a hot column of hexanol and subsequent conversion to dense spheres on sintering. When the sintering conditions were altered, spheres with an appreciable fine porosity and with high crush strength were obtained.

*Example VI*

A run was completed in which uranic oxide ($UO_2$) spheres were prepared using the equipment and procedures of Example IV. The operation was carried out using 3 separate solvents, butanol, hexanol, and ethylhexanol. The operating conditions for the column using the various solvents are set out in the table below:

COLUMN OPERATING CONDITIONS

| Solvent Column | Temperatures | | Flow Rates (cc./min.) | | Distillation Pot Temps. in ° C. |
|---|---|---|---|---|---|
| | Inlet | Outlet | Solvent | Recycle | |
| Butanol | 90 | 72 | 1,500 | 475 | 95 |
| Hexanol | 101 | 76 | 1,100 | 900 | 149 |
| Ethyl Hexanol | 149 | 101 | 3,000 | 1,375 | 175 |

The operation with butanol approached the water saturation of the butanol, e.g., 27 to 28 weight percent water. In each of these runs an 8 weight percent uranic oxide sol was injected at a rate of 6 cc. per minute at the top of the column. The products recovered were bright yellow dried uranic oxide microspheres. In each case, the spheres had smooth surfaces and a uniform defect-free internal structure as observed on microscopic and polished section examination. They had a green density of 1.7 cc. per gram. In general the $UO_3$ sol dried directly to uniform spheres and required less attention to solvent dehydration conditions and other limits. The $UO_3$ spheres were converted to $UO_2$ spheres on sintering in a hydrogen atmosphere for 4 hours at 1600° C. The $UO_2$ spheres had a density of 10.8 grams per cc. or 98.6% of theoretical. The spheres had smooth surfaces and a uniform *defect-free* internal structure. The desirable sintering characteristics of this colloidal material were indicated by the retention of their shape and structure throughout the large changes in density from 1.7 to 10.8.

In another run, dry uranic oxide-zirconia microspheres were obtained from a sol mixture using hexanol as a solvent. The spheres were subsequently converted to dense $UO_2$–$ZrO_2$ spheres on sintering in hydrogen.

The sol mixture was prepared from the respective sols in proportions resulting in a total oxide content of 4.7 weight percent. The oxide composition was 80% $UO_3$ and 20% $ZrO_2$. The pH of the sol was 4.6. The sol mixture was injected through a device yielding droplets of controlled size at the column top. Hexanol was the solvent used in this run. The column inlet temperature was 105 to 110° C. and teh outlet 78° C. The solvent was passed through the column at 650 cc. per minute without recycle or water spray injection. The distillate pot temperature was controlled at 128 to 132° C. to maintain about 2% water content in the circulating solvent.

As in the previous runs, equilibrium operating conditions were established with water and the sol injection was started at a rate of 0.4 gram of oxide per minute. The product recovered consisted of bright yellow spheres with smooth surfaces and a uniform defect-free internal structure. Control of droplet size resulted in a 90% yield of spheres in the 40–60 mesh size range.

Sintering four hours in hydrogen at 1600° C. formed black $UO_2$–$ZrO_2$ spheres of high density (about 95% of theoretical). The spheres had smooth surfaces and a uniform internal structure. X-ray data indicated reaction of the colloidal oxide constituent to form a urania-zirconia solid solution phase.

This example demonstrated the feasibility of drying $UO_3$ sols and $UO_3$–$ZrO_2$ sol mixtures to spheres by settling in a column of hot immiscible solvents. Solvents with an appreciable range of water saturation levels were employed each requiring minor adjustments in column conditions to obtain controlled drying which were related to their physical properties. The dried products were converted to dense uniform $UO_2$ spheres on high temperature sintering in hydrogen.

*Example VII*

This example describes the process of preparing yttria-urania microspheres using the equipment and procedure of Example II. The run was carried out by dripping a yttria-urania sol of 3 weight percent oxide content from a #20 needle into 12 liters of stirred boiling solvent composed of 1 part monochlorobenzene and 5 parts dichlorobenzene by volume. Distillation conditions had been established at 152° C. using a water flow of 7.4 cc. per minute and a solvent recycle of 80–90 cc. per minute. The yttria-urania sol contained dense spherical aggregate particles of 20–50 millimicrons in diameter, composed an intimate mixture of the constituent oxides with about 55 weight percent yttria.

The preparation followed the procedures described in Example II. On completion of sol addition, water was again added to the system at its initial rate for 2 minutes. Heating was stopped and the microsphere product recovered and dried. The product consisted of dense black spheres 40 to 120 microns in diameter. The microspheres were sintered under hydrogen for 4 hours at 972° C. without change in particle perfection. X-ray examination showed the microspheres had been converted to a yttria-urania solid solution phase with appreciable crystallite growth. Colloidal residues of the same yttria-urania sol, sintered under the same mild conditions, have shown in addition to the solid solution formation and crystallite growth, a density approaching the theoretical. This example demonstrates the use of a complex two constituent sol, differing appreciably in colloidal properties from the preceding sols, in the preparation of dried microspheres and their subsequent sintering to dense microspheres of a solid solution phase composed of the constituent oxides.

*Example VIII*

In this example, dried microspheres of thoria, zirconia, and yttria were prepared from their respective sols using hexanol as a solvent. The behavior of the sols of these oxides indicated that they would be equally susceptible to use in mixtures between themselves or sols of the foregoing examples after developing the minor procedural adjustments required with any colloidal material. The equipment and general procedure described in Example IV was used in these runs.

In the first of this series of runs, a 10% thoria sol prepared by electrodialysis was injected at 4.5 cc./minute at the top of the column, the solvent flow 650 cc./minute, and no solvent recycle or water spray was used. The column was operated at an inlet temperature of 92–93° C. and a distillation temperature of 106–110° C. to maintain a water content approaching 6% weight percent in the system. The product was dried white thoria microspheres of smooth surface and uniform texture.

In the second of this series of runs, a 10% yttria sol was injected at 3.5 cc./minute into the top of the column. Column operation conditions were as follows. 580 cc./minute solvent flow, 60 cc./minute solvent recycle, 11.4 cc./minute water spray injection, column inlet temperature 100.5° C., and distillation temperature 141° C. The product was white smooth-surfaced spheres of yttria of uniform appearance.

In the next run, a 15% zirconia sol was injected at 2 cc./minute at the top of the column. Operating conditions were as follows: 580 cc./minute, 60 cc./minute solvent recycle flow, 14 cc./minute water spray injection, column inlet temperature 103° C. and distillation at 134° C. The product was translucent white zirconia particles, approaching spherical. The particle had smooth surfaces and a uniform texture.

These examples demonstrate the preparation of microspheres from thoria, yttria, and zirconia sols, materials of widely differing colloidal properties, by settling dispersed droplets through a hot solvent column, in this case hexanol. Minor adjustments in processing conditions primarily involving temperature, flow rates, and water content were required for each material.

Obviously many modifications and variations to the invention may be made without departing from the essence and scope thereof and only such limitations should be applied as are indicated in the appended claims.

What is claimed is:
1. A process for preparing dense spherical oxide particles having diameters in the range of 5 to 500 microns which comprises dispersing a non-gelling oxide aquasol to form droplets of uniform size and concentration, drying said droplets over a period of at least 3 seconds and at a temperature sufficient to maintain their spherical form, recovering the dried sinterable colloidal oxide spheres having a volume fraction of water of less than 55 percent and sintering to high density product spheres.

2. A process for preparing dense spherical oxide particles having diameters in the range of 5 to 500 microns which comprises:
    (a) dispersing non-gelling oxide aquasol droplets into a stirred boiling solvent, having a water solubility of 2 to 28 weight percent,
    (b) drying said droplets to sinterable dried colloidal oxide spheres having a volume fraction of water of less than 60 percent on contact with the solvent, while
    (c) continuously removing water from the solvent by distillation,
    (d) collecting the particles on settling from the system, and
    (e) drying and sintering said particles to high density.

3. A process for preparing dense spherical oxide particles in the range of 5 to 500 microns which comprises:
    (a) dispersing oxide non-gelling aquasol droplets into a boiling stirred solvent mixture of hydrocarbons, chlorinated hydrocarbons, and alcohols having a density greater than 1 and a water solubility of 2 to 12 weight percent,
    (b) drying said droplets to dried sinterable colloidal oxide spheres having a volume fraction of water of less than 60 percent on contact with the solvent, while
    (c) continuously removing water from the system by distillation and solvent recycle,
    (d) collecting the particles on settling from the system and
    (e) drying and sintering said particles to high density.

4. A process for preparing dense sperical oxide particles having diameters in the range of 5 to 500 microns which comprises:
    (a) dispersing non-gelling aquasol droplets of oxides selected from the group consisting of actinide oxides, mixtures of actinide oxides with rare earth oxides, with zirconium oxide, rare earth oxides, iron oxide, aluminum oxide and titanium oxide into a stirred, partially immiscible chlorinated solvent mixture having a density of 1.3 to 1.6 and a water solubility of about 1 weight percent, heated to boiling,
    (b) drying said droplets to dried sinterable colloidal oxide spheres having a volume fraction of water of less than 60 percent on contact with said solvent, while
    (c) continuously removing water from the system by distillation and solvent recycle,
    (d) collecting the particles on settling from the system, and
    (e) drying and sintering said particles to high density.

5. A process according to claim 4 wherein the actinide oxide sol is uranium dioxide and the solvent is a mixture of chlorinated hydrocarbons with a boiling point between 80 and 160° C. and a density of 1.2 to 1.6.

6. A process according to claim 4 wherein the actinide oxide sol is thorium oxide and the solvent is a mixture of hydrocarbons with a boiling point between 80 and 160° C. and a density of 1.2 to 1.6.

7. A process according to claim 4 wherein the oxide sol is a mixed thoria-urania sol and the solvent is a mixture of chlorinated hydrocarbons having a boiling point between 80° C. and 160° C. and a density of 1.2 to 1.6 and a water solubility of about 1 percent.

8. A process according to claim 4 wherein the oxide sol is a mixed zirconia-urania sol and the solvent is a mixture of hydrocarbons having a boiling point between 80° C. and 160° C. and a density of 1.2 to 1.6 and a water solubility of about 1 percent.

9. A process for preparing dense oxide spherical particles having diameters in the range of 5 to 500 microns which comprises:
    (a) forming uniform droplets of a non-gelling oxide aquasol at the top of a column of a counter-flowing solvent having a water solubility of about 4 to 12 percent heated to a temperature of 0 to 50° C. below the water solvent system boiling point,
    (b) drying the droplets to dried sinterable colloidal oxide spheres having a volume fraction of water of less than 60 percent on settling through the solvent column, while
    (c) recirculating the solvent through a distillation system to remove water,
    (d) recovering the settled spheres and
    (e) drying and sintering to high density.

10. A process for preparing dense oxide spherical particles having diameters in the range of 5 to 500 microns which comprises:
    (a) forming uniform droplets of a non-gelling aquasol selected from the group consisting of actinide oxides, mixtures of actinide oxides with rare earth oxides with zicronium oxide, rare earth oxides, zirconium oxide, iron oxide, aluminum oxide and titanium oxide at the top of a column of counter flowing solvent consisting of an alcohol having a solubility for water of 3 to 30% heated to a temperature 0 to 50° C. below the boiling point of the water solvent system,
    (b) drying the droplets to sinterable colloidal oxide spheres having a volume fraction of water of less than 60 percent on settling through the solvent column, while
    (c) recirculating the solvent through a distillation system to remove water,
    (d) recovering the settled spheres, and
    (e) drying and sintering to high density.

11. A process for preparing dense oxide spherical particle having diameters in the range of 5 to 500 microns which comprises:
    (a) forming uniform droplets of a non-gelling aquasol selected from the group consisting of actinide oxides, mixtures of actinide oxides with rare earth oxides, with zirconium oxide, rare earth oxides, iron oxide, aluminum oxide and titanium oxide at the top of a column of counterflowing solvent consisting of an alcohol having a solubility for water of 3 to 30% heated to a temperature 0 to 50° C. below the boiling point of the water solvent system,
(b) drying the droplets to sinterable colloidal oxide spheres having a volume fraction of water of 60 to 25 percent on settling through the column of solvent containing 2 to 30% water, while
(c) recirculating the solvent through a distillation column both to remove water and to maintain said water content,
(d) recovering the settled spheres, and
(e) drying and sintering to high density product spheres.

12. A process according to claim 11 wherein the aquasol is an actinide oxide sol and the solvent is butanol, containing about 26 to 30% water, said water content being maintained by control of distillation step and by spraying water into said column.

13. A process according to claim 11 wherein the aquasol is an actinide oxide sol, the solvent is hexanol containing 2 to 6% water, said water content being maintained by control of the distillation step and spraying water into the column.

14. A process according to claim 11 wherein the aquasol is an actinide oxide sol, the solvent is ethyl-hexanol and the column is heated to 100–150° C.

15. A process according to claim 11 wherein the actinide oxide sol is uranium dioxide.

16. A process according to claim 11 wherein the actinide oxide sol is thorium dioxide.

17. A process according to claim 11 wherein the actinide oxide sol is a mixed thoria-urania sol.

18. A process according to claim 11 wherein the aquasol is a mixed uranium dioxide-zicronium sol.

References Cited
UNITED STATES PATENTS 3,171,715    3/1965    Kleinsteuber _____ 23—345

OTHER REFERENCES

AECD, April 1960, pp. 25–26.

CARL D. QUARFORTH, *Primary Examiner.*

L. DEWAYNE RUTLEDGE, *Examiner.*

R. L. GRUDZIECKI, *Assistant Examiner.*